Jan. 11, 1966 C. W. HUGHES ETAL 3,228,635
CONTROLLABLE PARACHUTES
Filed April 24, 1963 3 Sheets-Sheet 1
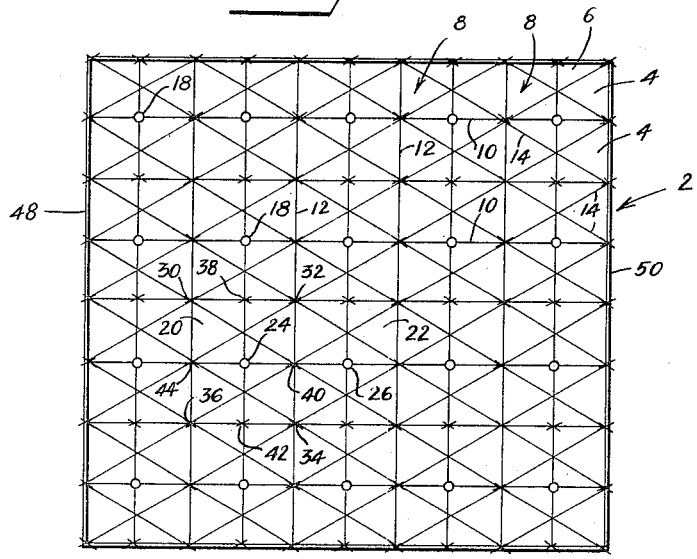
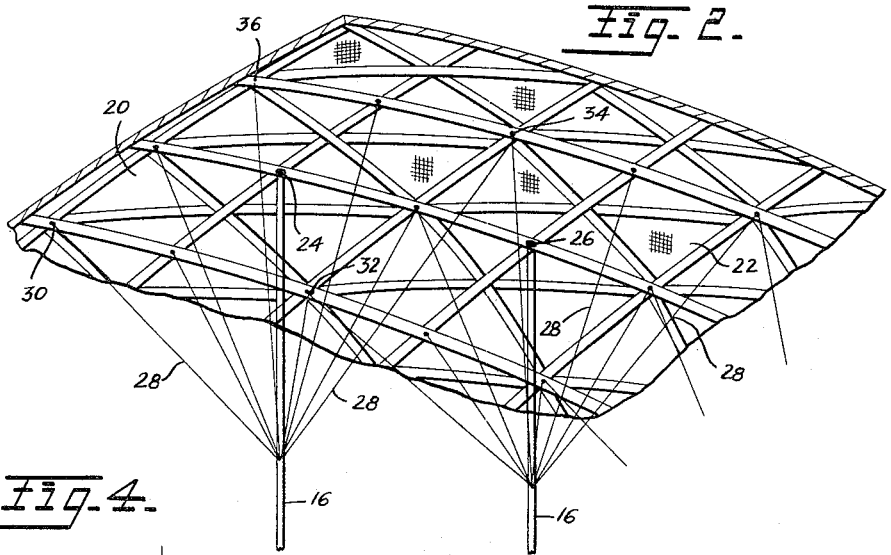
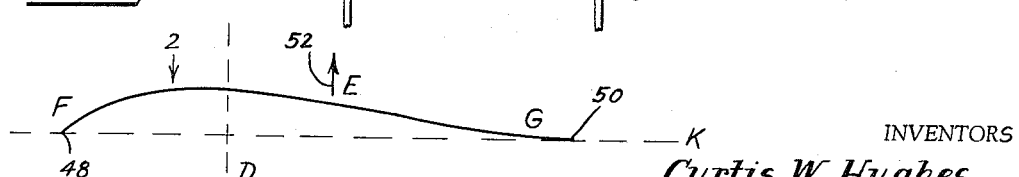
INVENTORS
Curtis W. Hughes
Loy B. Brydon
BY
Bacon & Thomas
ATTORNEYS

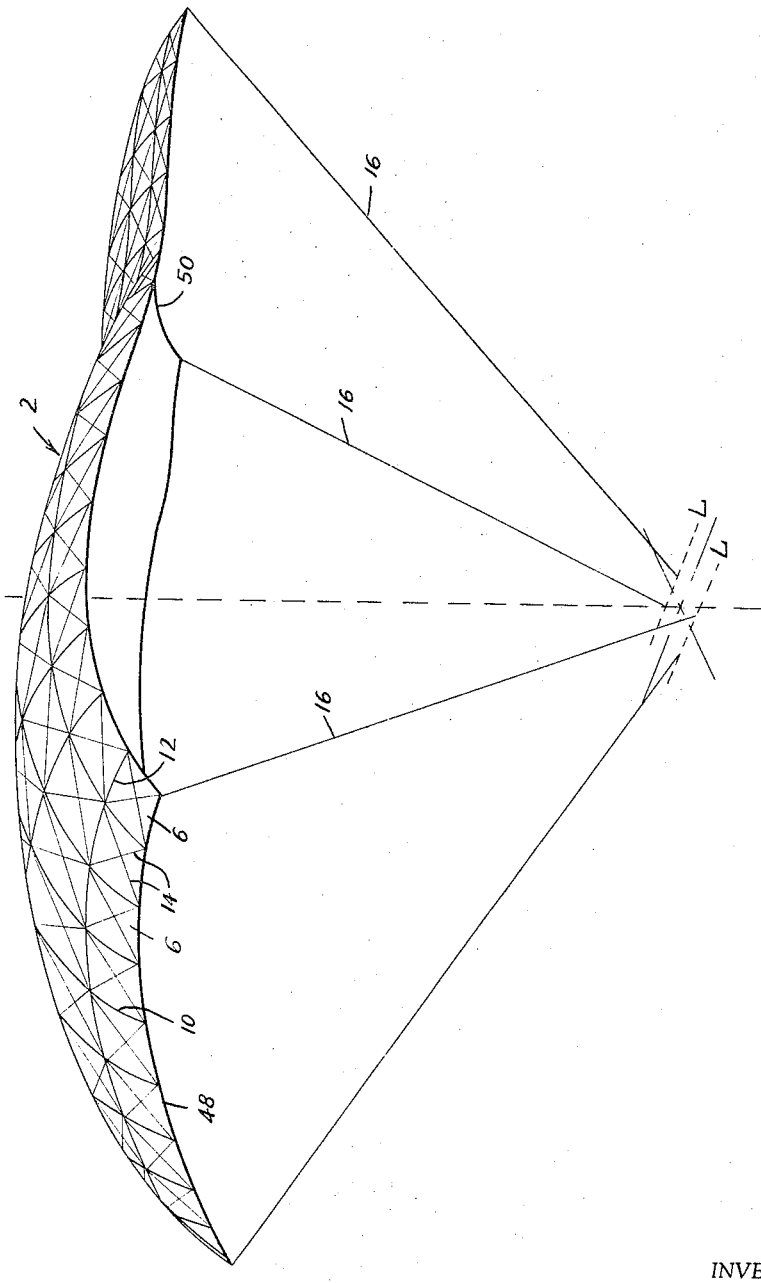

Jan. 11, 1966 C. W. HUGHES ETAL 3,228,635
CONTROLLABLE PARACHUTES
Filed April 24, 1963 3 Sheets-Sheet 3
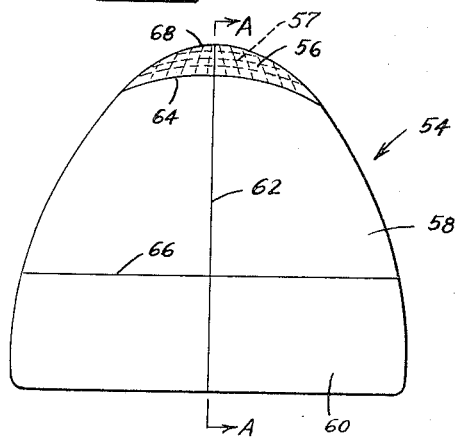
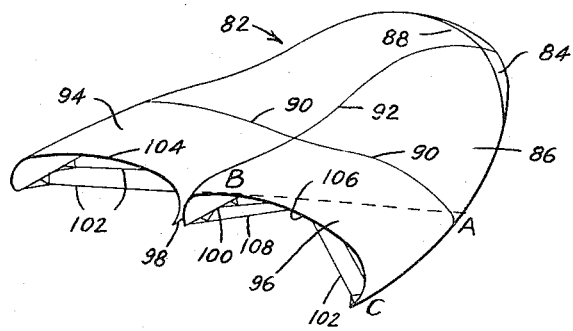
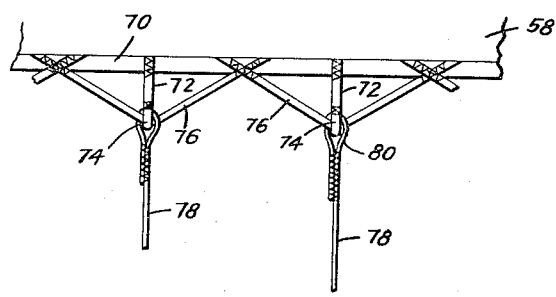
INVENTORS
Curtis W. Hughes
Loy B. Brydon
BY Bacon & Thomas
ATTORNEYS

United States Patent Office 3,228,635
Patented Jan. 11, 1966

3,228,635
CONTROLLABLE PARACHUTES
Curtis W. Hughes and Loy B. Brydon, Fayetteville, N.C., assignors to Capital Parachuting Enterprises, Fayetteville, N.C., a sole proprietorship
Filed Apr. 24, 1963, Ser. No. 275,290
23 Claims. (Cl. 244—145)

This invention relates generally to parachutes, and more particularly to novel controllable parachutes having an airfoil shape when inflated, and which can be readily guided to a preselected landing or target position.

Numerous controllable parachutes have been devised, many incorporating slits, incisions, or other devices for controlling the flow of air therethrough. The most common configuration for prior parachutes has been hemispherical, the parachutes being comprised of a plurality of panels sewn together to define a dome-like structure when inflated. Such parachutes are designed primarily for nearly vertical descent, and the air flow control devices utilized therewith for guiding purposes are, in many forms, merely a compromise construction.

The need has existed for a controllable parachute which can be easily manipulated to lower a load to a preselected position on the ground. For example, such parachutes are especially desirable in military applications for lowering men and materials from aircraft. Further, in competitive parachute jumping it is essential that the parachute used allow the parachutist to descend onto the preselected target. The parachute of the present invention is especially adapted to satisfy each of these requirements.

The subject parachute is preformed and constrained in such a manner that when it is inflated the parachute panel will define a lift-producing airfoil in longitudinal section. When a load is suspended from the inflated parachute panel the parachute will thus tend to glide in the manner of an aircraft. The airfoil configuration of the panel creates a degree of lift and, by properly controlling the peripheral edges thereof, the parachute can be guided in its path of descent to land upon any desired point.

It is an object of this invention to provide an aerodynamically shaped parachute that can be guided and controlled in its descent to land at a preselected point.

Another object is to provide a controllable parachute constructed so that the flow of air passing thereover can be directed and controlled to guide the path of descent thereof.

A further object is to provide a controllable parachute which can be opened at a point in the air laterally distant from the desired landing point, and which can be guided in its descent toward said landing point.

Still another object is to provide a load suspension line system for a controllable parachute, constructed to maintain said parachute in a predetermined aerodynamic configuration during the descent thereof.

It is also an object to provide a controllable parachute having controllable panel sections, so constructed that by manipulation thereof the direction of airflow thereover can be readily altered.

Yet another object is to provide a controllable parachute having a reinforced leading edge for movement laterally through the air without causing collapse or distortion of the inflated parachute.

Still another object is to provide a load suspension line system for a controllable parachute, constructed to be nonfouling and self-compensating in use.

Other objects and many of the attendant advantages of this invention will be readily appreciated as the same becomes better understood by reference to the following detailed description when considered in connection with the accompanying drawings, wherein:

FIG. 1 is a schematic plan view of the parachute panel of one embodiment of the invention, showing the manner in which said panel is constructed and reinforced;

FIG. 2 is a bottom perspective view of a portion of the parachute panel of FIG. 1, showing the manner in which load suspension lines are secured thereto;

FIG. 3 is a schematic view in perspective of the parachute of FIG. 1 in its inflated position, showing the aerodynamic configuration assumed thereby;

FIG. 4 is a longitudinal sectional view of the inflated parachute of FIG. 3, showing in elevation the configuration of the airfoil formed thereby;

FIG. 5 is a top plan view of a modified embodiment of the invention;

FIG. 6 is a perspective view of a modified embodiment of the parachute shown in FIG. 5; and FIG. 7 is an elevational view of a portion of the lower edge of the parachute of FIG. 5, showing the manner in which load suspension lines are attached thereto.

The parachute of the present invention comprises a parachute panel, constructed from a plurality of sewn together, reinforced fabric sections, to which is attached a plurality of load suspension lines, or shrouds. The lines are connected and proportioned in length relative to the panel so that when the latter is inflated with air, it will assume a lift-producing airfoil configuration in longitudinal section. The load suspended from the parachute reacts with the airfoil-shaped parachute panel to cause the entire assembly to glide through the air in a manner wellknown to those familiar with the science of aerodonetics. By pulling on various different lines, thereby distorting different sections of the parachute panel, the flow of air over the parachute is altered, whereby the glide path thereof may be readily changed.

Referring now to the drawings, a parachute panel is indicated at 2 in FIG. 1 and is comprised of a plurality of individual fabric squares 4. The squares 4 are placed in abutting relationship and are sewn together in pairs to define subsections 6, which subsections are in turn sewn together to define primary sections 8; thus, each primary section 8 is comprised of four of the fabric squares 4. The primary sections 8 are themselves sewn together along their peripheral edges to form the panel 2.

Reinforcing tapes 10 and 12, disposed at right angles to one another, are sewn to the panel 2 along the mating edges of the individual squares 4, and extend completely across said panel. Each subsection 6 has a pair of crisscross reinforcing tapes 14 sewn thereto, said tapes crossing in the middle of their respective subsections and functioning to insure that the fabric retains its desired aerodynamic shape. The general tessellate manner of constructing the parachute panel just described is common in the parachute art, as is the general use of reinforcing tapes, and hence this structure will not be further described herein.

The panel 2 has a plurality of load suspension lines 16 secured thereto, one of said lines being secured to the center of each of the primary sections 8, indicated by circles at 18. As is shown in FIG. 3, the individual load suspension lines extend downwardly from the parachute panel 2 and are connected with the parachute's load, indicated by the broken lines LL. For purposes of clarity, only four load lines 16 are illustrated in FIG. 3, it being understood that in the parachute construction of FIG. 1 there would be twenty such suspension lines.

In addition to supporting the parachute's load, the suspension lines 16 function to cause the normally flat parachute panel 2 to assume and maintain a desired aerodynamic shape upon the filling thereof by air. To assist the load lines 16 in causing the panel to assume its proper aerodynamic configuration, a plurality of tie lines 28 are utilized, as is best shown in FIG. 2, which illustrates the suspension line system for two primary sections 20 and 22 of the panel 2. As is shown in FIGS. 1 and 2, the load lines 16 are secured to the centers 24 and 26, respectively, of said primary sections 20 and 22, and eight tie lines 28 are secured to each of said load lines at a common point below the surface of the panel 2. One of the tie lines 28 extends to each of the four corners 30, 32, 34 and 36 of the primary section 20, said corners being indicated by X's in FIG. 1, and the remaining four tie lines for said section extend to the middle of the sides thereof, indicated by X's at 38, 40, 42 and 44 in FIG. 1. The primary section 22 has similar tie lines 28 secured thereto and attached to one of the suspension lines 16, as does each of the twenty primary sections comprising the panel 2.

The load lines 16 have varying lengths proportioned so that when the parachute is inflated and said lines are taut the parachute panel 2 will assume the configuration of a lift-producing airfoil, as is shown in FIGS. 3 and 4. As is best shown in FIG. 4, the airfoil thus formed includes a leading edge 48 and a trailing edge 50, and the parachute panel extending between said edges has the rounded configuration normal for a lift-producing airfoil surface.

The load is suspended below the parachute along a vertical axis indicated by the broken line D, and when the inflated parachute is suspended in the air, said load will cause the parachute to move through the air. Air will then flow over the leading edge at F, over the top rounded surface of the parachute, and thence over the trailing edge at G into the region K; because of the configuration of the parachute, a negative pressure region will be created by said airflow in the region E over the aft portion of the panel 2. Simultaneous with the flow of air over the top of the panel 2, air will also flow under said panel. The pressure differential existing between the top and the bottom of the panel results in a net upward lifting force, indicated by the arrow 52 in FIG. 4. Thus, the parachute of the invention will tend to glide through the air in the manner of a gliding aircraft.

The direction of glide of the parachute of FIG. 1 may be altered by deforming different portions of the inflated parachute panel 2. These deformations may be caused by exerting a pulling force on one or several of the load lines 16. A right turn of the descending parachute may be accomplished by deforming the right lateral side of the generally rectangular parachute panel in the vicinity of the negative pressure region E. This deformation will create vanes in the panel, which will alter the air flow over the parachute in such a manner that it will execute a right turn in its descending path. Similarly, by distorting the left lateral side of the parachute panel, a left turn may be accomplished. If the trailing edge 50 of the parachute is deformed downwardly, the net effect will be to slow, or altogether stop, the forward movement of the descending assembly. If deformation of said trailing edge is sufficiently severe and of a sufficiently long duration, the parachute will even tend to reverse its direction of glide. Thus, it is readily seen that the parachute 2 may be controlled to give very complete control over its path of descent.

The parachute panel 2 is constructed of any suitable fabric, such as nylon. The fabric utilized should be processed and finished, as by spraying with a plastic or rubber composition, to provide it with a non-porous surface whereby to prevent break-up of the airfoil and to provide a smooth surface therefor. Further, the use of such coated fabrics assists the parachute panel in the retention of its aerodynamic configuration.

It is to be understood that instead of the eight tie lines and one load line utilized in FIG. 1 for each primary section of the parachute panel, a separate load line might be attached at each of the points indicated by the circles and X's in FIG. 1. However, the very large plurality of load lines thus resulting would be excessively bulky, and would lead to easy fouling of the parachute assembly. Thus, the unique suspension line arrangement shown in FIGS. 1 and 2 contributes significantly to a reduction of weight and an increase in safety for the parachute.

The parachute embodiment of FIG. 1 results in a parachute capable of being controlled to provide nearly any desirable path of descent. However, the multiple load lines necessary to provide an aerodynamic shape for the normally flat parachute panel of said embodiment may result in wrinkles and ripples in the aerodynamic surface. Further, the leading edge 48 thereof is subject, as in prior conventional parachutes, to distortion inwardly upon the body of the parachute during lateral movement thereof, especially in the presence of gusts and headwinds. A second embodiment of the invention is thus illustrated in FIG. 5 which overcomes these disadvantages.

Referring to FIG. 5, a second embodiment of the invention is shown which differs from that of FIG. 1 in the manner in which the aerodynamic configuration of the parachute panel is obtained and in the shape thereof in plan view. In the parachute of FIG. 1 the aerodynamic surface is developed from a flat panel and, hence, numerous wrinkles may often be present therein. The parachute of FIG. 5, however, is intended to be constructed upon a solid form, the exterior of which has a shape corresponding to the desired inflated configuration of the parachute. The fabric sections comprising the parachute panel are cut to size and are sewn together upon the form so that the resultant parachute has as its normal configuration the aerodynamic shape which it is desired to have it assume upon inflation. By so fashioning the parachute the need for a plurality of load lines distributed uniformly across the surface of the panel is eliminated; rather, the load lines need be connected only at spaced points along the peripheral edges thereof.

In FIG. 5 a parachute is indicated generally at 54, and comprises a nose panel 56, a main body panel 58, and a trailing panel section 60. While the manner of construction of the panels 56, 58 and 60 is not shown for purposes of clarity, it is to be understood that said panels are constructed in the usual tesselate manner described with reference to FIG. 1. The panel sections 56, 58 and 60 are reinforced by a plurality of tapes (not shown in FIG. 5) in the same manner as the parachute of FIG. 1, and a primary reinforcing tape 62 is secured to and extends longitudinally down the center of the parachute panel. A pair of spaced, transverse primary tapes 64 and 66 extend across the width of the parachute 54, the tape 66 being positioned along the negative pressure region E of the parachute. The longitudinal, sectional, aerodynamic configuration of the parachute 54, taken generally along the line AA in FIG. 5, is identical to the longitudinal, sectional configuration shown in FIG. 4.

The nose panel 56 is rounded in the plan view, and the lateral edges of the parachute panel are rounded and taper outwardly from the leading edge 68 toward the trailing edge of the parachute. By thus rounding said nose and the lateral edges, the parachute readily penetrates the body of the air into which it advances during its glide. Thus, the tendency for the leading edge of the parachute to deform is alleviated, thereby insuring that the airfoil configuration of the parachute will not be significantly altered. The nose portion of the parachute may, if desired, be reinforced by suitable plastic or other semi-rigid inserts 57 sewn therein to further reduce any tendency of said leading edge to buckle.

The peripheral edges of the parachute 54 have load suspension lines secured thereto at spaced intervals therealong, the manner in which said lines are attached being shown in FIG. 7. Referring to FIG. 7, a portion of the main body panel section 58 is shown in elevation and has a reinforced tape 70 secured along its lower peripheral edge. Primary suspension tapes 72 are secured, as by sewing, at spaced intervals along said reinforcing tape 70 and extend downwardly normally therefrom; the primary suspension tapes 72 each terminate at their lower end in a loop 74 sewn therein. A secondary suspension tape 76 passes thorugh each loop 74, and the opposite ends thereof extend upwardly to the reinforced tape 70 where they are secured in position. A load suspension line 78 is threaded through the loop 74, and is turned back and sewn upon itself to define a loop 80. The connections between the primary suspension tapes 72, the secondary suspension tapes 76, and the load lines 78 act as frictional slip joints to allow the load lines to shift away from a position extending normally to the reinforcing tape 70 while still exerting uniform tension thereon. The unique suspension line arrangement illustrated in FIG. 7 thus permits the lead lines from all points on the periphery of the parachute to be terminated at their lower ends on the parachute load, while insuring that the tension on said periphery will remain equal to all points therealong. Thus, a parachute suspension line arrangement has been provided which imparts stability to the parachute. The opposite ends of the adjacent secondary suspension tapes 76 preferably are overlapped on the reinforcing tape 70, whereby to further insure an even distribution of the parachute load.

The parachute 54 is especially adapted for use in the presence of gusts and headwinds, in that the rounded leading edge thereof is less susceptible to deformation than the straight leading edge of the parachute of FIG. 1. Further, the fashioned contour of the parachute 54 provides a smooth aerodynamic surface which causes a minimum of disruption to the air flow passing over the parachute.

The load suspension lines 78, as was true of the similar suspension lines 16 in FIG. 1, are each proportioned in length so that the aerodynamic configuration of the parachute will be retained while it is inflated. The proportioning of these load lines is facilitated in the parachute 54 by elevating the parachute panel upon its fashioning form to a height equal at least to the vertical height intended to be present between said panel and the parachute load. The load lines may then be easily attached to the load and proportioned to the proper length. It is, of course, not necessary that each load line terminate at the load. If desired, each load line may consist of a loop with the opposite ends being connected to two separate points on the perimeter of the parachute.

The parachute 54 is easily manipulated in flight by pulling on the load lines 78 attached near the opposite ends of the transverse, primary tape 66. This distorts the aerodynamic surface in the vicinity of the negative pressure region, and hence functions in the manner described hereinabove to cause the parachute to maneuver. For example, if a right turn of the parachute is desired, the right end of the transverse primary tape 66 is pulled downwardly; this causes the trailing panel section to form a vane that deflects the air passing thereover in such a manner as to cause the parachute to make a sharp right turn.

The parachutes of FIGS. 1 and 5, because of the uninterrupted manner in which air flows over the airfoil surfaces thereof, are substantially free from the oscillation present in conventional hemispherical parachutes. This constitutes an important achievement in the parachute art, as it thus makes it possible to much more easily guide the parachute along its path of descent.

A third embodiment of the invention is illustrated in FIG. 6, which employs novel panel sections for substantially eliminating pitch and yaw that might tend to occur under conditions of severe buffeting in the presence of gusty headwinds.

Referring to FIG. 6, a parachute 82 is shown incorporating a rounded nose panel 84 and a main panel 86, said panels being identical in construction to the panels 56 and 58 of the parachute 54. A pair of transverse primary reinforcing tapes 88 and 90, and a longitudinal primary reinforcing tape 92, are attached to said panels and are identical in construction and purpose to the tapes 62, 64 and 66 of FIG. 5. Secured to the rear edge of the main panel 86 is a pair of identical trailing panel sections 94 and 96, the confronting edges 98 and 100, respectively, of said trailing sections being independent of each other. The trailing sections 94 and 96, like the other sections comprising the parachute 82, are constructed from fabric in the fashioned manner described hereinabove with respect to the parachute 54, and the confronting portions of said section are shaped so that when inflated, they lie against each other for a substantial portion of the areas thereof.

A plurality of load lines 102 is secured to the entire outer periphery of the parachute 82 except for the trailing edges 104 and 106, respectively, of the sections 94 and 96, the load lines being attached to said peripheral edges in a manner identical to that shown in FIG. 7. The adjacent, confronting edges 98 and 100 of the panels 94 and 96 have similar load lines 108 secured thereto in the same manner, and all the load lines 102 and 108 extend downwardly to the parachute load.

In operation, the trailing panel sections 94 and 96 of the parachute 82 function as breathers to compensate for pitch and yaw tendencies of the descending parachute, and act to compensate for atmospheric disturbances in the local air through which the parachute is passing. Thus, they contribute significantly to the smoothness and uniformity of the parachute's descent.

The trailing section panels 94 and 96 also serve another important function in that they facilitate control of the parachute. Because the panels are substantially independent of each other, the air deflection vanes, formed thereby when the load lines in the vicinity of the transverse primary tape 90 are pulled, are sharply defined. Referring to FIG. 6, assume that the load lines at the right end of the primary tape 90 are pulled. The resultant deflection of the parachute will be generally along the dotted line A–B, whereby a relatively sharp triangular vane defined by the panel portion A, B, C will be formed. This sharply defined vane acts to rapidly alter the air flow passing over the airfoil, and hence causes a speedy maneuvering response for the parachute.

The parachute of the present invention, in a normal glide descent attitude in still air, will glide at a horizontal speed of about 15–20 miles per hour. Hence, it is essential that rapid directional turning be possible to avoid over-shooting the desired set-down point. The two trailing panel sections provide the rapid response desired for precise maneuvering, and are especially useful during the final maneuvering usually required during the last few hundred feet of a parachute's descent.

While the deflection of the aerodynamic parachute surface to provide maneuverability may occur at any point between the vertical axis D, FIG. 3, and the trailing of the parachute, it has been found that the best maneuverability is obtained when deflection is caused along the resultant force line 52. It is well known that by deflecting the periphery of a parachute maneuverability may be obtained. However, the maneuverability obtained by this method with prior parachutes is substantially less in degree and response than is obtainable from the unique aerodynamically-shaped parachute of the present invention.

The present parachute may be launched from an aircraft, balloon, or other airborne device in the normal manner for parachutes. However, it possesses another launching capability previously unknown in the parachute art. Because the inflated parachute of the invention defines an aerodynamic surface that creates a degree of lift when it is flown at the proper angle of attack to the air stream, it is possible to launch the present parachute from the ground by merely towing it with a suitable moving vehicle. The desirability of such launching is especially great for parachute jumping contests, and when the weather is severely overcast or suitable aircraft are unobtainable. Thus, the parachute of the present invention not only performs all the functions normally obtainable from such devices, but provides maneuverability and launching capabilities heretofore unknown.

Obviously, many modifications and variations of the present invention are possible in the light of the above teaching. It is, therefore, to be understood that within the scope of the appended claims, the invention may be practiced otherwise than as specifically described.

We claim:

1. A controllable parachute, comprising: a flexible panel having leading and trailing edges and lateral edges therebetween; and a plurality of load lines attached to the undersurface of said panel and extending downwardly to serve as support for a load, said load lines being proportioned in length to cause said panel when inflated with air to assume and maintain a lift-producing airfoil configuration terminating in a generally flat and generally horizontally extending aft portion adjacent said trailing edge.

2. A controllable parachute as recited in claim 1, wherein said panel is initially flat and is comprised of a plurality of interconnected primary sections, and wherein one of said load lines is attached centrally to the undersurface of each of said primary sections to extend downwardly therefrom.

3. A controllable parachute as recited in claim 2, including additionally, a plurality of tie lines associated with each load line and having one end thereof secured to a point on said load line positioned below its associated primary section, the other end of said tie lines being secured to spaced points on the peripheries of their associated primary sections.

4. A controllable parachute as recited in claim 1, wherein said panel is pre-shaped to conform to the intended airfoil configuration therefor.

5. A controllable parachute as recited in claim 1, wherein said load lines, connected to the undersurface of said panel, are connected only at spaced points about the periphery thereof.

6. A controllable parachute as recited in claim 1, wherein said panel is initially flat and is comprised of a plurality of primary sections having adjacent edges, means securing said adjacent edges of said primary sections together along substantially the entire lengths thereof, and one of said load lines being attached centrally to the undersurface of each of said primary sections to extend downwardly therefrom.

7. A controllable parachute as recited in claim 1, wherein said aft portion is split longitudinally medially thereof.

8. A controllable parachute as recited in claim 1, wherein said aft portion is split longitudinally medially thereof to define a pair of adjacent panel sections, and wherein said load lines are attached at spaced positions only along said leading edge and said lateral edges of said panel and along the confronting longitudinal edges of said adjacent panel sections.

9. A controllable parachute as in claim 1, wherein said aft portion of said airfoil configuration is rearwardly of and at a lesser camber than the maximum camber of said airfoil configuration.

10. A controllable parachute, comprising: a flexible panel having leading and trailing edges and lateral edges therebetween; and a plurality of load lines attached at spaced points to the undersurface of said panel and extending downwardly to a load, said load lines being proportioned in length to cause said panel to assume and maintain a lift-producing airfoil configuration in longitudinal section when it is inflated with air, said airfoil being configured to create a negative pressure region above said panel when said inflated parachute is translated to cause air to move thereover from said leading edge toward said trailing edge, and said airfoil terminating in a generally flat and generally horizontally extending aft portion adjacent said trailing edge.

11. A controllable parachute as recited in claim 10, wherein said panel is constructed of fabric coated with a substantially nonporous flexible material.

12. A controllable parachute as recited in claim 10, wherein said panel is initially flat and is comprised of a plurality of interconnected primary sections, each of said sections having reinforcing tapes secured thereto and extending thereacross, and wherein one of said load lines is attached centrally to the undersurface of each of said primary sections to extend downwardly therefrom; and wherein each of said load lines has one end of a plurality of tie lines secured thereto at a common point below its associated primary section, the other end of said tie lines being secured to spaced points on the peripheries of the primary sections to which their associated load lines are connected.

13. A controllable parachute as recited in claim 10, wherein said panel is pre-shaped to conform to the intended airfoil configuration therefor, and wherein said load lines are connected to the undersurface of said panel only at spaced points about the periphery thereof.

14. A controllable parachute as recited in claim 10, including additionally: a plurality of downwardly extending, primary supporting tapes secured to the peripheral edges of said panel at spaced intervals therealong, each of said primary tapes terminating at its lower end in a loop; and a secondary supporting tape associated with each primary tape and having its central portion disposed within said loop thereon, the opposite ends of each supporting tape extending upwardly from said loop to said peripheral edge and being secured thereto, each of said load lines having a loop in the upper end thereof passing through said loop in one of said primary suspension tapes.

15. A controllable parachute as recited in claim 10, wherein said leading edge is rounded and the lateral edges of said panel taper outwardly from said rounded leading edge toward said trailing edge.

16. A controllable parachute as recited in claim 15, wherein the portion of said panel immediately behind said rounded leading edge has reinforcing elements secured thereto for retaining the desired aerodynamic configuration thereof.

17. A controllable parachute as recited in claim 15, wherein said panel is pre-shaped to conform to the intended airfoil configuration therefor, and wherein additionally said aft portion of said airfoil is split longitudinally medially thereof to define a pair of adjacent panel sections, and wherein said load lines are attached at spaced positions only along the leading edge and the lateral edges of said panel, and along the confronting longitudinal edges of said adjacent panel sections.

18. A controllable parachute as recited in claim 17, wherein the forward edges of said adjacent panel sections are positioned centrally of the negative pressure region of said airfoil, and including additionally a primary transverse reinforcing tape extending across said panel at said forward edges.

19. A controllable parachute, comprising: a flexible panel having at its periphery leading and trailing edges and lateral edges therebetween; a plurality of load lines; means connecting said load lines to the undersurface of said panel only at spaced points about the periphery thereof; said load lines extending downwardly to a load and being proportioned in length to cause said panel to assume and maintain, and said panel being pre-shaped to conform to, a lift-producing airfoil configuration in longitudinal section when said panel is inflated with air; said airfoil being configured to create a negative pressure region above said panel when the inflated parachute is translated to cause air to move thereover from said leading edge toward said trailing edge; and said connecting means including a plurality of downwardly extending primary supporting tapes secured to the periphery of said panel at spaced intervals therealong, each of said primary tapes terminating at its lower end in a loop, a secondary supporting tape associated with each primary tape and having its central portion disposed within said loop thereon, the opposite ends of each supporting tape extending upwardly from said loop to the periphery of said panel and being secured thereto, and each of said load lines having a loop in the upper end thereof passing through said loop in one of said primary suspension tapes.

20. A controllable parachute, comprising: a plurality of primary sections interconnected to form a flexible and initially flat panel having leading and trailing edges and lateral edges therebetween; a plurality of load lines attached to the undersurface of said panel and extending downwardly to serve as support for a load, one of said load lines being attached centrally to the undersurface of each of said primary sections of said panel to extend downwardly therefrom; and said load lines being proportioned in length to cause said panel when inflated with air to assume and maintain a lift-producing airfoil configuration terminating in a generally horizontally extending aft portion adjacent said trailing edge.

21. A controllable parachute as recited in claim 20, including additionally, a plurality of tie lines associated with each load line and having one end thereof secured to a point on said load line positioned below its associated primary section, the other end of said tie lines being secured to spaced points on the peripheries of their associated primary sections.

22. A controllable parachute, comprising: a flexible panel having leading and trailing edges and lateral edges therebetween, said leading edge being rounded and said lateral edges tapering outwardly from said rounded leading edge toward said trailing edge; a plurality of load lines attached at spaced points to the undersurface of said panel and extending downwardly to a load, said load lines being proportioned in length to cause said panel to assume and maintain a lift-producing airfoil configuration in longitudinal section when it is inflated with air; said airfoil configuration being configured to create a negative pressure region above said panel when said inflated parachute is translated to cause air to move thereover from said leading edge toward said trailing edge, and said airfoil configuration terminating in a generally horizontally extending aft portion adjacent said trailing edge; and reinforcing elements secured to the portion of said panel immediately behind said rounded leading edge thereof for retaining the desired aerodynamic configuration thereof.

23. A controllable parachute, comprising: a flexible panel having leading and trailing edges and lateral edges therebetween; a plurality of load lines attached to the undersurface of said panel and extending downwardly to serve as support for a load; said load lines being proportioned in length to cause said panel when inflated with air to assume and maintain a lift-producing airfoil configuration terminating in a generally horizontally extending aft portion adjacent said trailing edge; said aft portion being split longitudinally medially thereof to define a pair of adjacent panel sections; and said load lines being attached at spaced positions only along said leading edge and said lateral edges of said panel and along the confronting longitudinal edges of said adjacent panel sections.

References Cited by the Examiner

UNITED STATES PATENTS

| | | | |
|---|---|---|---|
| 2,723,094 | 11/1955 | Berckmuller | 244—145 |
| 3,104,857 | 9/1963 | Knacke | 244—145 |
| 3,117,753 | 1/1964 | Ewing | 244—145 |
| 3,141,640 | 7/1964 | Sutliff et al. | |

OTHER REFERENCES

Popular Mechanics, pp. 85–89, November 1961.

MILTON BUCHLER, *Primary Examiner.*

FERGUS S. MIDDLETON, *Examiner.*